United States Patent
Adamik

(10) Patent No.: US 9,758,063 B1
(45) Date of Patent: Sep. 12, 2017

(54) VEHICLE SEAT ASSEMBLY

(71) Applicant: LEAR CORPORATION, Southfield, MI (US)

(72) Inventor: Peter Adamik, Erding (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/053,553

(22) Filed: Feb. 25, 2016

(51) Int. Cl.
*B60N 2/20* (2006.01)
*B60N 2/22* (2006.01)

(52) U.S. Cl.
CPC ....... *B60N 2/20* (2013.01); *B60N 2/22* (2013.01)

(58) Field of Classification Search
CPC ................................... B60N 2/20; B60N 2/22
See application file for complete search history.

(56) References Cited

U.S. PATENT DOCUMENTS

| | | | | |
|---|---|---|---|---|
| 3,926,474 A * | 12/1975 | Johndrow | ............ | B60N 2/2356 16/307 |
| 4,641,885 A * | 2/1987 | Brauning | ............ | A47C 1/03277 297/292 |
| 5,704,689 A * | 1/1998 | Kim | .............. | A47C 7/441 297/301.4 |
| 5,915,788 A | 6/1999 | Schneider | | |
| 2007/0187972 A1* | 8/2007 | Takatsura | ............ | B60N 2/22 296/65.09 |
| 2015/0008629 A1* | 1/2015 | Kuno | .............. | F16F 1/10 267/156 |

FOREIGN PATENT DOCUMENTS

| | | |
|---|---|---|
| EP | 1747936 A2 | 1/2007 |
| WO | 2005068249 A1 | 7/2005 |

\* cited by examiner

*Primary Examiner* — Philip Gabler
(74) *Attorney, Agent, or Firm* — Brooks Kushman P.C.

(57) ABSTRACT

A vehicle seat assembly includes a seat frame and a seat back pivotably attached to the seat frame. A spring cooperates with the seat back to oppose forward and rearward rotation of the seat back over at least a portion of the rotation range. An actuator is attached to and pivotable with the seat back, and it is configured to contact the spring at a first position during the forward rotation of the seat back and at a second position during the rearward rotation of the seat back.

20 Claims, 3 Drawing Sheets

VEHICLE SEAT ASSEMBLY

TECHNICAL FIELD

The present disclosure relates to a vehicle seat assembly.

BACKGROUND

Springs and other damping mechanisms may be used to help control movement of a vehicle seat—for example, when the seat back is adjusted to a desired use position or when it is folded down for cargo or to allow ingress to a more rearward seat. In some cases it may be desirable to have a certain damping force or torque when a seat back is moved in one direction and a different damping force or torque when the seat back is moved in the other direction. To accomplish this, separate damping mechanisms may be employed for each direction of the seat back movement. This adds cost and complexity to the vehicle seat assembly, however, and is therefore not ideal. In addition, if a seat assembly installed in a vehicle requires a particular damping force or torque, while the same seat assembly in a different vehicle requires a different damping force or torque, completely different damping mechanisms may be employed for the same seat assembly on different vehicles. This also adds to complexity and cost in the manufacturing process. It would therefore be desirable to have a seat assembly that overcomes some or all of these shortcomings.

SUMMARY

At least some embodiments of the present invention may include a vehicle seat assembly having a seat frame configured for attachment to a vehicle, and a seat back attached to the seat frame and rotatable in a forward direction and a rearward direction relative to the seat frame. A spring may cooperate with the seat back to oppose rotation of the seat back in the forward direction over at least a portion of a forward rotation of the seat back, and to oppose rotation of the seat back in the rearward direction over at least a portion of a rearward rotation of the seat back. The spring may include a fixed end and a free end. An actuator is attached to and pivotable with the seat back, and is configured to contact the free end of the spring at a first position during the forward rotation of the seat back and at a second position during the rearward rotation of the seat back.

At least some embodiments of the present invention may include a vehicle seat assembly having a seat frame configured for attachment to a vehicle, and a seat back pivotably attached to the seat frame. At least a portion of a spring may be fixedly mounted relative to the seat back, and an actuator may be attached to the seat back. The actuator may be configured to cooperate with the spring such that the spring opposes a forward rotation of the seat back with a first force and a rearward rotation of the seat back with a second force.

At least some embodiments of the present invention may include a vehicle seat assembly having a seat frame configured for attachment to a vehicle, and a seat back pivotably attached to the seat frame. A motion-control arrangement including a spring may be attached to the seat frame and have a first end extending away from a center of the spring. An actuator may attached to and pivotable with the seat back, and the actuator may include a first contact arm configured to contact the first end of the spring at a first distance from the center of the spring during a forward rotation of the seat back, and a second contact arm configured to contact the first end of the spring at a second distance from the center of the spring during a rearward rotation of the seat back.

BRIEF DESCRIPTION OF THE DRAWINGS

FIG. 5 shows a partial cross-sectional view of a portion of a motion-control arrangement in accordance with embodiments of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
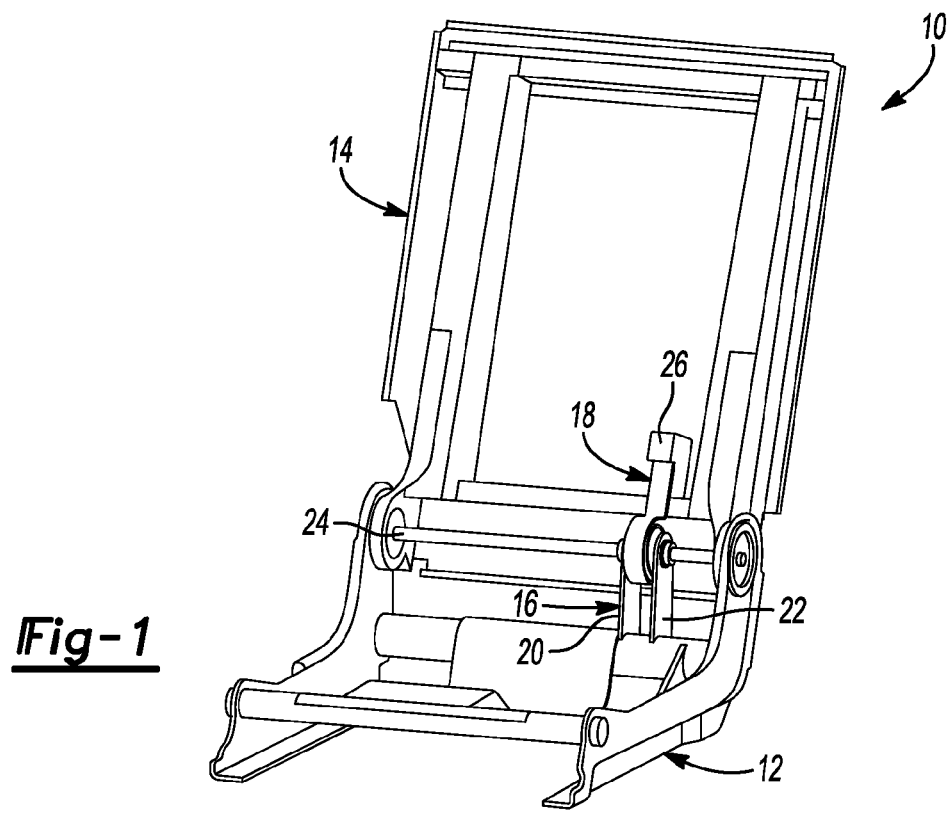
FIG. 1 shows a perspective view of a portion of a seat assembly in accordance with embodiments of the present invention.

FIG. 1 shows a vehicle seat assembly 10 in accordance with embodiments of the present invention. The seat assembly 10 includes a seat frame 12 configured for attachment to a vehicle. In particular, the seat frame 12 shown in FIG. 1 may be bolted to a floor of the vehicle directly, or indirectly, for example, through movable rails to allow a fore and aft movement of the seat assembly 10. A seat back 14 is attached to the seat frame 12, and is rotatable in a forward direction and a rearward direction relative to the seat frame 12. It is understood that various cushioning material and upholstery will be applied to the seat frame 12 to provide a seat cushion, and to the seat back 14 to provide a completed seat back assembly.

In accordance with at least some embodiments of the present invention, the seat assembly 10 includes a motion-control arrangement 16 disposed on a right side of the seat assembly 10 as it is oriented in FIG. 1. Although a single motion-control arrangement such as shown in FIG. 1 may be used, other embodiments of the invention may have two such motion-control arrangements, laterally spaced apart toward respective sides of the seat assembly. The motion-control arrangement 16 includes a spring 18, which is attached to the seat frame 12 through brackets 20, 22 and a support rod 24. Thus, at least a portion of the spring 18 is fixedly mounted relative to the seat back 14. The motion-control arrangement 16 also includes an actuator 26, which will be explained in more detail below along with other features of embodiments of the present invention.

Figure 2:
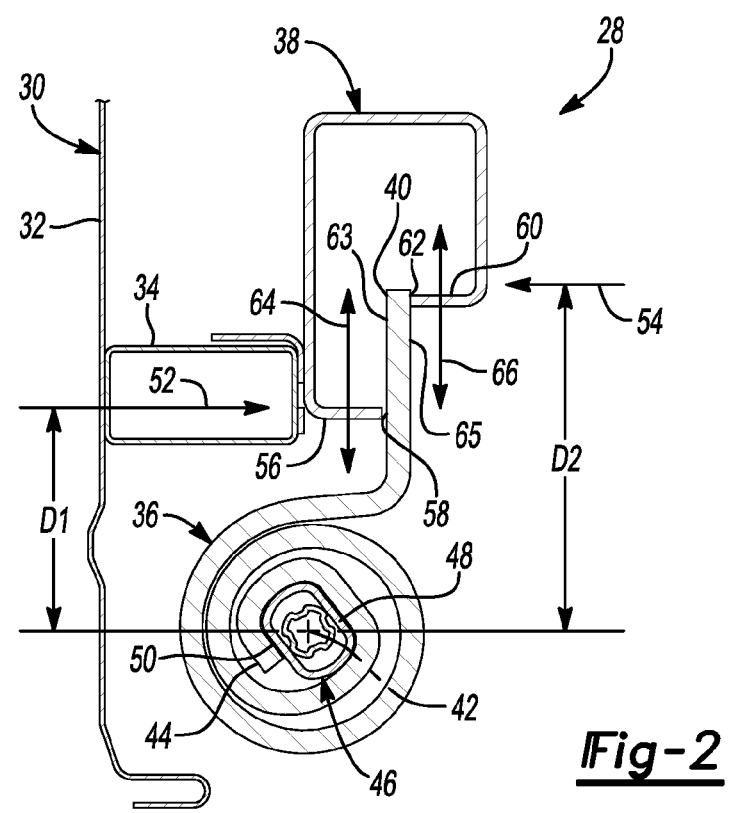
FIG. 2 shows a partially schematic side view of a motion-control arrangement in accordance with embodiments of the present invention.

FIG. 2 shows a partially schematic representation of a portion of a motion-control arrangement 28 configured similarly to the motion-control arrangement 16 shown in FIG. 1. In FIG. 2, a portion of a seat back 30—i.e., a portion of a seat back frame—is shown. The seat back 30 includes a first portion 32, and a second portion 34 extending outward from the first portion 32. The motion-control arrangement 28 includes a spring 36 and an actuator 38. In the embodiment shown in FIG. 2, the spring 36 is configured as a flat bar, coiled to form a torsion spring, although it is understood that different types of springs and spring geometries may be used and are contemplated in accordance with embodiments of the invention. The spring 36 includes a first end 40, which in the embodiment shown in FIG. 2, is a free end extending away from a center 42 of the spring 36.

The spring 36 also includes a fixed end 44, which is wrapped around a cylindrical element 46 having flattened sides 48, 50, which allows the fixed end 44 of the spring 36 and the cylindrical element 46 to rotate or cease rotation together. The fixed end 40 of the spring 36 may be fixed to the cylindrical element 46 through welding, adhesive, or some other fixation process; however, as shown in FIG. 2, it may also be fixed merely by being tightly coiled around the outer surface of the cylindrical element 46 without any additional fixation process. As described and illustrated herein, the "ends" of a spring, such as the spring 36, do not necessarily refer to the exact point of termination of the spring material along its length; rather, as shown in FIG. 2, the ends 40, 44 of the spring 36 generally indicate a position near a point of termination of the spring material.

In general, a spring, such as the spring 18 shown in FIG. 1 or the spring 36 shown in FIG. 2, is configured to cooperate with a corresponding seat back to oppose a rotation of the seat back in a forward direction over at least a portion of a forward rotation of the seat back, and to oppose rotation of the seat back in a rearward direction over at least a portion of the rearward rotation of the seat back. Although not illustrated in FIG. 2, it is understood that the seat back 30 is pivotably attached to a seat frame similar to the embodiment illustrated in FIG. 1. Therefore, the arrow 52 shown in FIG. 2 represents a forward movement, and in particular a forward rotation, of the seat back 30. Similarly, the arrow 54 represents a rearward movement, and in particular a rearward rotation, of the seat back 30.

In the embodiment shown in FIG. 2, the actuator 38 is attached to the seat back 30 through the second portion 34, and it is pivotable with the seat back 30. The attachment may be made through welding, adhesive, separate fasteners, or any manner fixation effective to achieve the desired result. The actuator 38 includes a first portion having a first contact arm 56, which is configured to contact the first end 40 of the spring 36 at a first position 58 during forward rotation of the seat back 30. Similarly, a second portion of the actuator 38 having a second contact arm 60 is configured to contact the first end 40 of the spring 36 at a second position 62 during a rearward rotation of the seat back 30. As shown in FIG. 2, the first position 58 is on one side 63 of the first end 40 of the spring 36, and is at a first distance ($D_1$) from the center 42 of the spring 36 as measured perpendicularly to the arrow 52. Similarly, the second position 62 is on another side 65 opposite the side 63, and is at a second distance ($D_2$) from the center 42 of the spring 36 as measured perpendicularly to the arrow 54. In the embodiment shown in FIG. 2, the distances ($D_1$), ($D_2$) are different from each other, and in particular, the distance ($D_1$) is shorter than the distance ($D_2$). As explained in more detail below, the difference in these distances allows the actuator 38 to cooperate with the spring 36 in such a way that the spring 36 opposes a forward rotation of the seat back with a first force and a rearward rotation of the seat back with a second force, which in this embodiment is different from the first force.

As indicated by the vertical arrows 64, 66, the first and second contact arms 56, 60 may be positioned at different points along the first end 40 of the spring 36. To achieve this, the entire actuator 38 may be moved up or down to a new position, or it could be reconfigured so that one or both of the contact arms 56, 60 contact the spring 36 in a different location or locations. As described above, the spring 36 is configured as a torsion spring; torsion springs oppose rotation by providing a reaction torque that is proportional to the angular deflection of the spring. In the embodiment shown in FIG. 2, rotation of the spring 36 is effected by a forward rotation of the seat back 30—see direction arrow 52—or a rearward rotation of the seat back 30—see direction arrow 54. Thus, rotation of the seat back 30 applies a torque to the spring 36, which the spring 36 opposes through a reaction torque. Even though it is a torque, the torque applied to the spring 36 by rotation of the seat back 30 is an applied moment, which is characterized by: the amount of force at the first position 58 times the first distance ($D_1$) for forward rotation, and the amount of force at the second position 62 times the second distance ($D_2$) for rearward rotation. Similarly, the spring 36 opposes the forward rotation of the seat back 30 by applying a force through the first contact arm 56 in a direction opposite the arrow 52. This force, previously identified as a "first force" is characterized by the reaction torque provided by the spring 36 divided by the first distance ($D_1$). The spring 36 also opposes the rearward rotation of the seat back 30, but it does so by applying a force through the second contact arm 60 in a direction opposite the arrow 54. This force, previously identified as a "second force" is characterized by the reaction torque provided by the spring 36 divided by the first distance ($D_2$).

As described above, the reaction torque provided by a spring, such as the spring 36, is proportional to its angular deflection—more specifically, it is a function of the angular deflection and the spring constant. It is therefore understood that the force transferred through the first or second contact arm 56, 60 will vary as the angular deflection of the spring 36 varies, but that for any given position of the spring 36, it will oppose forward rotation of the seat back 30 with a first force, and it will oppose a rearward rotation of the seat back 30 with a second force, even though those forces may change depending on the position of the seat back 30. As described in more detail below, embodiments of the invention may be configured so that a motion-control arrangement, such as the motion-control arrangement 28 shown in FIG. 2, only dampen or otherwise oppose movement of an associated seat back over a portion of the forward or rearward rotation of the seat back. More specifically, there may be a portion of the seat back movement over which there is no reaction force applied by a spring or other damping mechanism.

Figure 3:
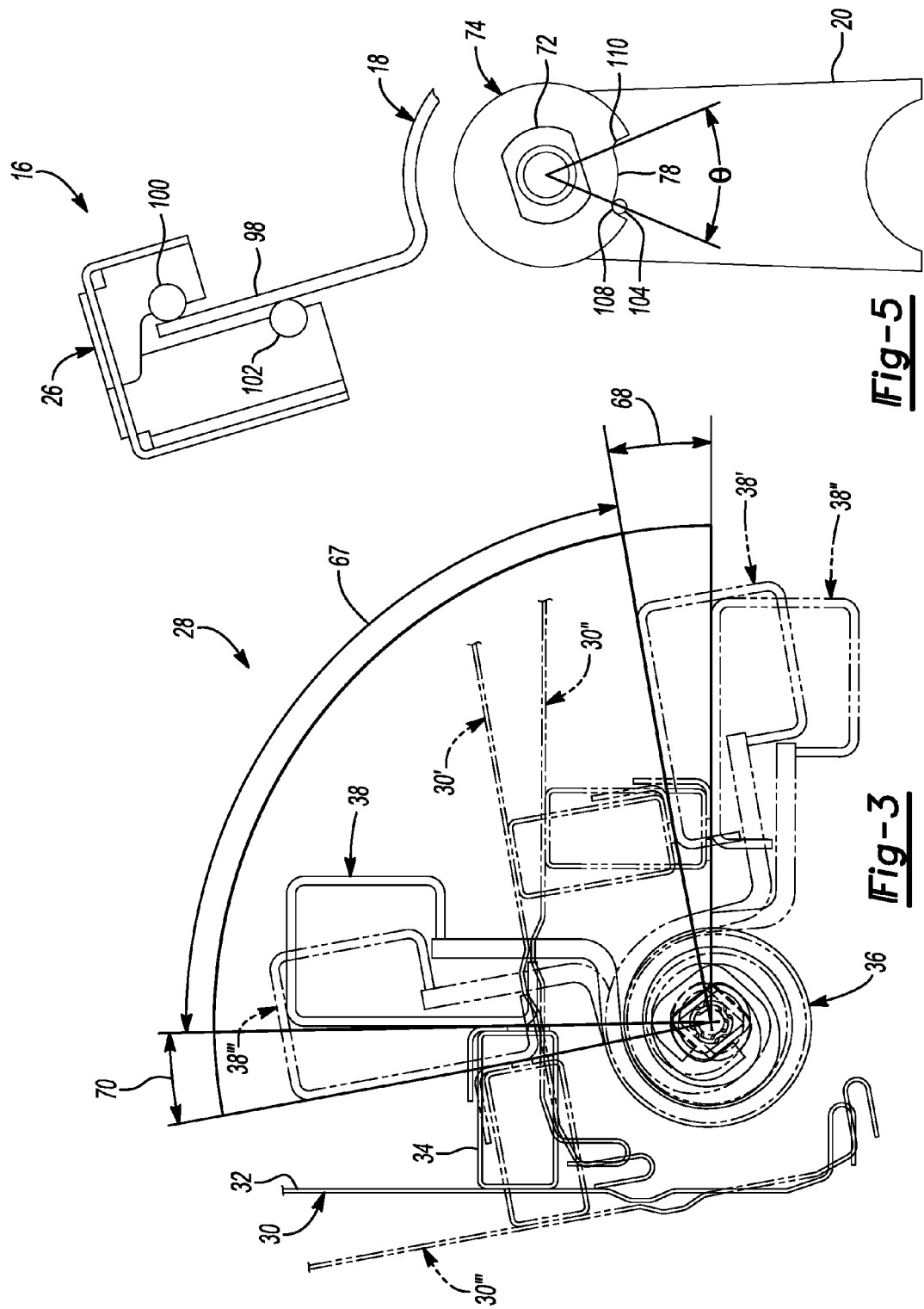
FIG. 3 shows the motion-control arrangement from FIG. 2 throughout various ranges of motion.

FIG. 3 illustrates this configuration, where the motion-control arrangement 28 is configured to dampen rotation of the seat back 30 over only a portion of its entire range of rotation. In FIG. 3, the prime ('), double prime (") and triple prime ('") symbols are used to designate the same elements in different positions. For example, the seat back 30 is shown as a solid line in FIG. 3 when it is in the vertical use position, such as also shown in FIG. 2. As the seat back 30 is rotated forward, there is a free-rotation range 67 wherein the motion-control arrangement 28, and in particular the spring 36, does not oppose rotation of the seat back 30. The same is true for a rearward rotation of the seat back 30 when it is in the free-rotation range 67—there is no opposition of movement provided by the motion-control arrangement 28. When the seat back 30 reaches a forward damping position indicated by the seat back 30', the motion-control arrangement 28 begins to oppose further rotation. It is worth noting that the free-rotation range 67 as illustrated in FIG. 3 uses the back of the actuator 38 as its reference point, and that is why it extends beyond the point at which the seat back 30' begins to experience damping; however, the end of the free-rotation range 67 does coincide with the position of the actuator 38'.

Once the seat back 30' reaches the forward damping position, it continues to move forward over a first range or first damping range 68 until it reaches its fully folded position indicated by the seat back 30" and the position of the actuator 38". When the seat back 30" is rotated rearward, the damping mechanism 28 will provide assistance as opposed to opposition during the first damping range 68. Then, the damping mechanism 28 will neither oppose nor assist movement over the free-rotation range 67. Once the seat back 30 is again in its upright use position, the damping mechanism 28 will oppose further rearward rotation over a second range or second damping range 70, until the seat back 30' has reached a final position.

Figure 4:
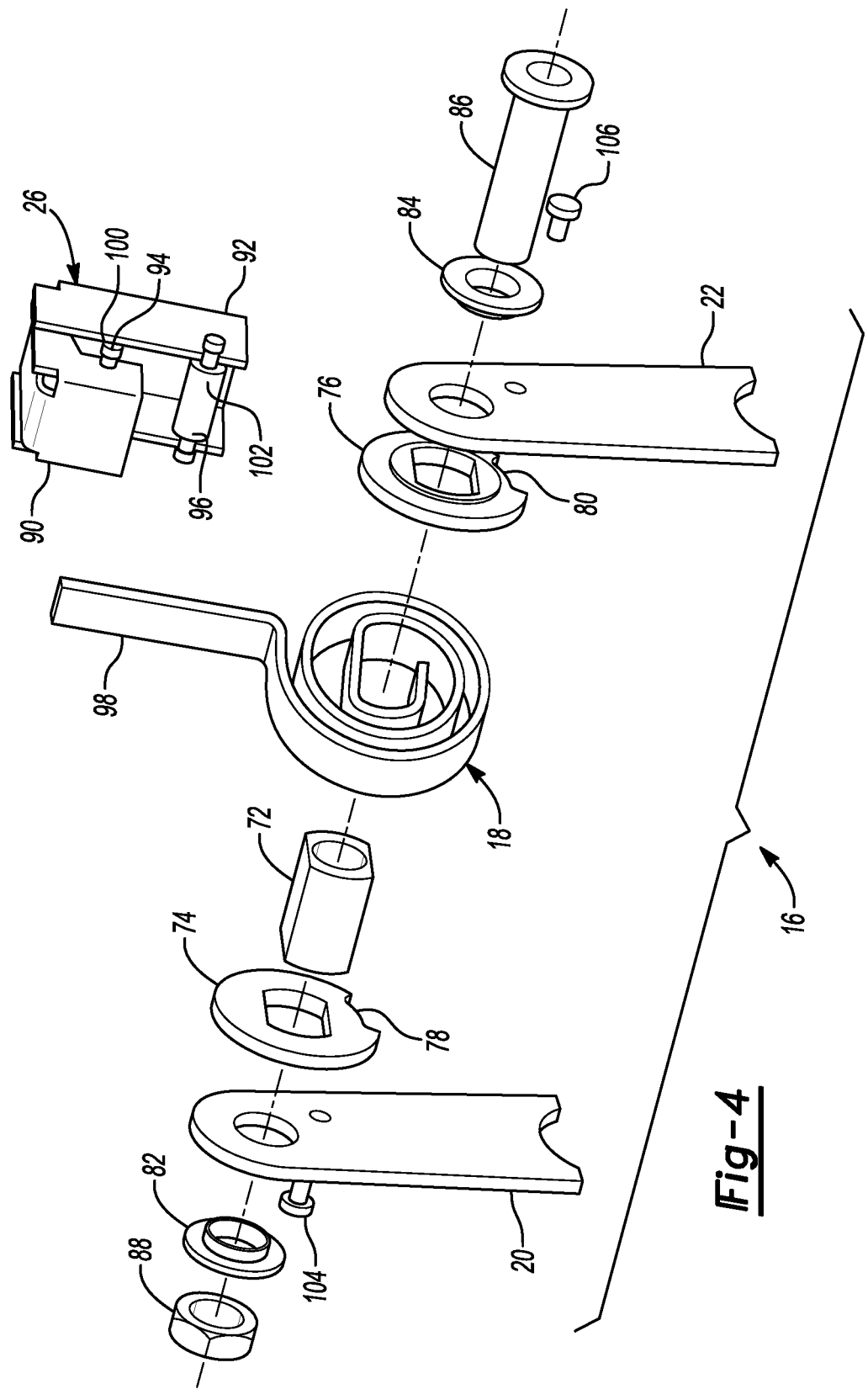
FIG. 4 shows an exploded view of a motion-control arrangement in accordance with embodiments of the present invention.

The specific configuration of one embodiment of a motion-control arrangement that provides for different damping ranges and a free-rotation range is described in more detail with reference to FIGS. 4 and 5. FIG. 4 shows an exploded view of the motion-control arrangement 16, which is shown assembled and installed in a seat assembly 10 in FIG. 1. The motion-control arrangement 16 includes the spring 18 and the actuator 26 configured to cooperate with the spring 18 in much the same way as the actuator 38 cooperates with the spring 36 illustrated and described in FIGS. 2 and 3. The motion-control arrangement 16 also includes the two brackets 20, 22, which can be used to attach the motion-control arrangement 16 to the seat frame 12 as shown in FIG. 1. A cylindrical element 72 is configured similarly to the cylindrical element 46 shown in FIG. 2. It is configured to be inserted into the center of the spring 18 and to have two range-limiting discs 74, 76 attached to it between the brackets 20, 22. In at least some embodiments, range-limiting discs such as the range-limiting discs 74, 76 may be made from a polymeric material, or they may have a relatively-soft covering material, to help reduce noise as the seat back 14 pivots.

As described in more detail below in conjunction with FIG. 5, the range-limiting discs 74, 76 have respective cutout portions 78, 80. On the outsides of the brackets 20, 22, bushings 82, 84 are provided, and a pivot pin 86 is disposed through the center of all of the other components and is secured with a nut 88. The actuator 26 includes first and second portions 90, 92, respectively having first and second contact arms 94, 96, which are configured to contact a free end 98 of the spring 18. Similar to the configuration described above in conjunction with FIG. 2, the two contact arms 94, 96 are configured to contact the spring 18 at different distances from its center, such that one reaction force is provided for forward rotation of the seat back 14, while a different reaction force is provided for rearward rotation of the seat back 14. As shown in FIG. 4, the first contact arm 94 has a first rolling member 100 associated with it. In fact, in the embodiment shown in FIG. 4, the roller 100 embodies the contact arm 94 and will have direct contact with the spring 18. Similarly, associated with the second contact arm 96 is a second rolling member 102, which also embodies its contact arm 96 and is configured to contact the spring 18. The actuator 26 may be attached to the seat back 14 by any effective method, including those described above with regard to the actuator 38 and its attachment to the seat back 30.

The damper mechanism 16 illustrated in FIG. 4 also includes two range-limiting pins 104, 106, which are configured to respectively cooperate with the range-limiting discs 74, 76 to provide some of the functionality described in conjunction with the embodiment illustrated in FIG. 3. FIG. 5 shows a partial cross-sectional view of a left side view of the motion-control arrangement 16. In particular, it shows how rolling members 100, 102 contact the free end 98 of the spring 18 when the motion-control arrangement 16 is assembled. As the seat back 14 is rotated forward or rearward, there will be some linear movement of the actuator 26 up and down the free end 98 of the spring 18. The rolling elements 100, 102 help to ensure that there is no binding at the contact points of the actuator 96 and the spring 18. In at least some embodiments, rolling elements such as the rolling elements 100, 102 may be rubber-coated or they may have another type of relatively-soft covering material to help reduce noise as the seat back 14 pivots.

It is shown in FIG. 5 how the range-limiting disc 74 interacts with the range-limiting pin 104 to define the first and second damping ranges and the free-rotation range as described above with regard to the embodiment shown in FIG. 3. The cutout portion 78 of the range-limiting disc 74 includes two ends 108, 110. As long as the seat back 14 is rotated in a range where neither of the ends 108, 110 impinge on the pin 104—this is indicated by the angle θ in FIG. 5—there will be no damping and no opposition of seat-back movement from the motion-control arrangement 16. This is because the range-limiting disc 74 will rotate with the seat back 14, as will the cylindrical member 72 and the spring 18. Once the seat back 14 is rotated to a position where either of the ends 108, 110 of the cutout portion 78 impinges on the range-limiting pin 104, the range-limiting disc 74 ceases to rotate, as does the cylindrical member 72; this causes the spring 18 to become fixed at its center and it will provide a reaction force against further rotation in that direction. The bracket 22, the range-limiting disc 80, and the range-limiting pin 106 function in the same way on the other side of the spring 18—see FIG. 4.

As shown in FIG. 5, the free end 98 of the spring 18 is angled backward beyond a vertical reference, and the pin 104 is impinged on the end 108 of the cutout portion 78. Therefore, in this view the spring 18 is providing a reaction force to oppose rearward—i.e., counterclockwise as shown in FIG. 5—rotation. This is analogous to the second damping range 70 shown in FIG. 3. Clockwise rotation of the actuator 26, which is analogous to forward rotation of the seat back 14, will be aided by the spring 18 until its free end 98 is in an approximately vertical position. Further clockwise movement beyond vertical will cause rotation of the range-limiting disc 74, the cylindrical member 72, and the spring 18—this is the free-rotation range indicated by the angle θ in FIG. 5. Further clockwise rotation will cause the end 110 of the cutout portion 78 to impinge on the range-limiting pin 104, and the spring 18 will again provide a reaction force to further rotation in this direction. This is analogous to the first damping range 68 shown in FIG. 3. Different types of springs, actuators and range limiters may be used with embodiments of the invention to provide a desired control over rotation of a seat back.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly, comprising:
   a seat frame configured for attachment to a vehicle;
   a seat back attached to the seat frame and rotatable in a forward direction and a rearward direction relative to the seat frame;
   a spring cooperating with the seat back to oppose rotation of the seat back in the forward direction over at least a portion of a forward rotation of the seat back, and to oppose rotation of the seat back in the rearward direction over at least a portion of a rearward rotation of the seat back, the spring including a fixed end and a free end; and
   an actuator attached to and pivotable with the seat back, and configured to contact the free end of the spring at a first position during the forward rotation of the seat back and at a second position during the rearward rotation of the seat back.

2. The vehicle seat assembly of claim 1, wherein the first position is located at a first distance from a center of the spring, and the second position is located at a second distance from the center of the spring.

3. The vehicle seat assembly of claim 2, wherein the first distance is shorter than the second distance.

4. The vehicle seat assembly of claim 1, wherein the spring is configured to oppose movement of the seat back over only a portion of the forward rotation of the seat back and only a portion of the rearward rotation of the seat back.

5. The vehicle seat assembly of claim 1, wherein the spring cooperates with the seat back to allow the seat back to rotate freely in a free-rotation range, wherein the spring does not oppose rotation of the seat back over a portion of the forward rotation of the seat back and the spring does not oppose rotation of the seat back over a portion of the rearward rotation of the seat back.

6. The vehicle seat assembly of claim 5, wherein the spring cooperates with the seat back to oppose the forward rotation of the seat back in a first range, and to oppose the rearward rotation of the seat back in a second range, the free-rotation range being between the first range and the second range.

7. The vehicle seat assembly of claim 1, wherein the actuator includes at least one rolling member configured to contact the free end of the spring during at least one of the forward rotation of the seat back or the rearward rotation of the seat back.

8. A vehicle seat assembly, comprising:
   a seat frame configured for attachment to a vehicle;
   a seat back pivotably attached to the seat frame;
   a spring, at least a portion of which is fixedly mounted relative to the seat back; and
   an actuator attached to the seat back and configured to cooperate with the spring such that the spring opposes a forward rotation of the seat back with a first force and a rearward rotation of the seat back with a second force.

9. The vehicle seat assembly of claim 8, wherein the actuator includes a first portion configured to contact the spring at a first location during the forward rotation of the seat back to oppose at least a portion of the forward rotation, and a second portion configured to contact the spring at a second location during a rearward rotation of the seat back to oppose at least a portion of the rearward rotation.

10. The vehicle seat assembly of claim 9, wherein the actuator cooperates with the spring to oppose the forward rotation of the seat back over a first range and oppose the rearward rotation of the seat back over a second range, and wherein the spring is configured to provide no opposition during rotation of the seat back over a free-rotation range angularly disposed between the first and second ranges.

11. The vehicle seat assembly of claim 9, wherein the spring has a first end extending outward from the spring, the first and second portions of the actuator being configured to contact the spring on the first end.

12. The vehicle seat assembly of claim 11, wherein the first location is on the first end of the spring and is at a first distance from a center of the spring, and the second location is on the first end of the spring and is at a second distance from the center of the spring.

13. The vehicle seat assembly of claim 12, wherein the first location is on one side of the first end of the spring, and the second location is on another side of the first end of the spring opposite the one side.

14. The vehicle seat assembly of claim 13, wherein at least one of the first and second portions of the actuator includes at least one rolling member configured to respectively contact at least one the first and second locations.

15. A vehicle seat assembly, comprising:
   a seat frame configured for attachment to a vehicle;
   a seat back pivotably attached to the seat frame; and
   a motion-control arrangement including a spring attached to the seat frame and having a first end extending away from a center of the spring, and an actuator attached to and pivotable with the seat back, the actuator including:
      a first contact arm configured to contact the first end of the spring at a first distance from the center of the spring during a forward rotation of the seat back, and
      a second contact arm configured to contact the first end of the spring at a second distance from the center of the spring during a rearward rotation of the seat back.

16. The vehicle seat assembly of claim 15, wherein the actuator further includes a first rolling member associated with the first contact arm, and a second rolling member associated with the second contact arm, the first and second rolling members being positioned to respectively contact the first end of the spring at the first and second distances.

17. The vehicle seat assembly of claim 15, wherein the first and second distances are different from each other.

18. The vehicle seat assembly of claim 15, wherein the motion-control arrangement is configured to oppose movement of the seat back over only a portion of the forward rotation of the seat back and only a portion of the rearward rotation of the seat back.

19. The vehicle seat assembly of claim 18, wherein the motion-control arrangement is further configured to provide a free-rotation range wherein rotation of the seat back is not opposed.

20. The vehicle seat assembly of claim 15, wherein the first and second contact arms contact opposing sides of the first end of the spring.

* * * * *